Dec. 8, 1953         L. F. THIRY         2,661,969
FLANGED RUBBER JOINT
Filed Nov. 8, 1949
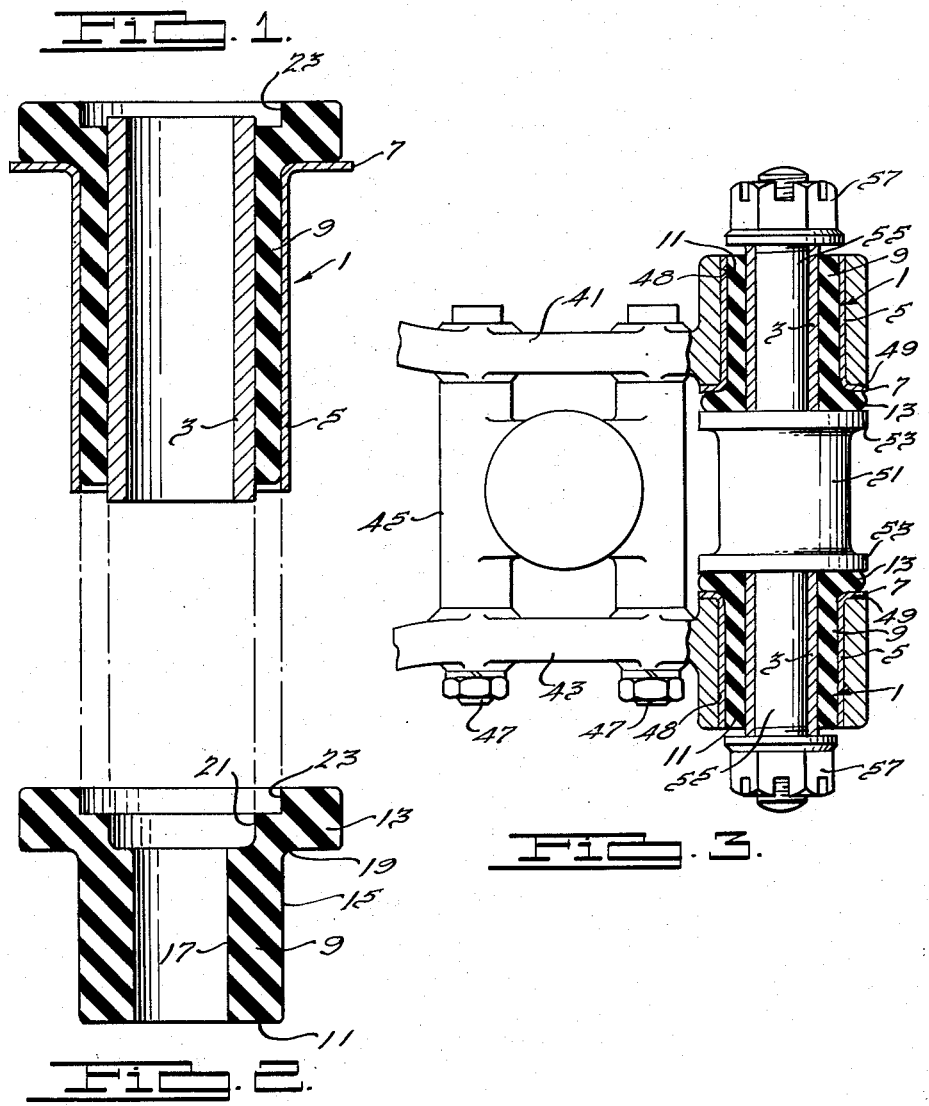
INVENTOR.
Leon. F. Thiry.
BY
Harness, Dickey & Pierce.
ATTORNEYS.

Patented Dec. 8, 1953

2,661,969

UNITED STATES PATENT OFFICE 2,661,969

FLANGED RUBBER JOINT

Leon F. Thiry, Montclair, N. J.

Application November 8, 1949, Serial No. 126,154

2 Claims. (Cl. 287—85)

This invention relates generally to flexible joints of the type in which an intermediate annular layer of rubber resiliently interconnects rigid inner and outer sleeves. It particularly concerns flanged joints of this type wherein the rubber layer between the sleeves is in a state of high radial compression and appreciable axial elongation and has an integral outwardly radial flange outside the sleeves which is not so stressed.

Flexible joints of the type pertinent to the present invention have heretofore consisted of radially spaced inner and outer annular members between which was interposed a molded annular rubber member which in its free state possessed an outer diameter which was substantially greater than the inner diameter of the outer annular member and an inner diameter which was substantially less than the outer diameter of the inner annular member; this assembly of annular members being accomplished by the method described and claimed in the present inventor's U. S. Patent No. 1,739,270. The ratio of diameters of the rubber insert to the inner and outer members in joints of this type is such that the insert is very substantially reduced in radial thickness, so much so that in almost every case the length of the insert is increased by more than 50% and sometimes by as much as 150%. The insert is thus in an extreme state of radial compression and extensive commercial experience has shown that in bearings, for example, it provides unsurpassed radial and oscillating load resisting and sustaining characteristics in conjunction with great resistance to deterioration and wear.

The weakness of joints of this type lies in their limited resistance to axial loads. This can be substantially overcome, however, by providing the rubber insert with an outwardly extending radial flange which ordinarily, though not necessarily, engages a cooperating radial flange or end face on the outer sleeve. This assembly of inner and outer sleeves with a flanged rubber insert is a self contained, individual unit of manufacture which may then be placed in an environment such that radial and torque loads act on the sleeves and axial loads bear against the radial face of the rubber flange to press it against the flange on the outer sleeve.

It will be recognized that as a self contained unit the flanged flexible joint contains a rubber insert which is in a highly undesirable stress condition. The outer diameter of the cylindrical portion of the insert is substantially less than what it would be in the free state but the radial flange that is joined thereto is undeformed. Thus, at the juncture between the inside face of the flange and the outer diameter of the cylindrical portion of the insert, there is an extreme non-uniformity of stress that promotes radial shear of the rubber and such readily takes place during use of the joint.

In order to eliminate this plane of stress concentration it has been proposed to form a thin radial groove at the juncture of the flange and outer diameter which extends radially inwardly from the free outer diameter to a diameter equal to that of the inner surface of the outer sleeve. This is a successful solution to the problem but it increases the cost of manufacturing the insert due to mold complications or the expense of the grooving operation.

It is the main object of the present invention to eliminate the plane of stress concentration between the flange and outer surface in rubber inserts of the type described without increasing the cost of manufacturing the insert.

In accomplishing this object the invention employs a flanged rubber insert having in its free state an outer diameter which is substantially the same for its entire length as the inner diameter of the outer sleeve into which it is inserted. The inner diameter of the insert is, as in the prior art, of smaller diameter than the outer diameter of the inner sleeve. By this arrangement radial compression of the insert is achieved substantially entirely through expansion of its inner diameter and the outer diameter remains substantially unchanged. The outer surface of the insert adjacent the flange is therefore not stressed in radial tension relative to the flange, as in the prior inserts, and the harmful plane of stress concentration is eliminated.

It will be recognized that in order to obtain the same degree of radial compression as compared with prior inserts, the inner diameter of the present insert must be expanded and thus stressed more than heretofore. This provides the incidental advantage of increasing the adherence of the insert to the inner sleeve and thus reenforcing what has been the weaker contact area in joints of the type indicated. Another collateral advantage of the present structure is that the insert may, in the preferred arrangement, be simply inserted by hand in the outer annular member; it being unnecessary to employ a high speed press as heretofore.

Other features and objects of the invention will appear upon consideration of the accompanying drawings which illustrate a preferred form thereof in which:

Fig. 1 shows the flexible joint unit of the invention;

Fig. 2 shows the rubber insert of this invention prior to assembly in the unit of Fig. 1; and Fig. 3 shows an application of the flexible joints of this invention.

The present flexible joint 1 consists of an inner sleeve 3, an outer sleeve 5 having a radial flange 7 at one end, and a rubber insert 9.

The rubber insert 9 consists of a cylindrical portion 11 and a radial flange 13 integral therewith. In the free state the outer surface 15 of the cylindrical portion 11 is of a diameter over its entire length that is approximately the same as the inner diameter of the outer sleeve 5. In the free state the inner surface 17 of the cylindrical portion 11 is of a diameter that is appreciably smaller than the outer diameter of the inner sleeve 3, the exact value depending upon the degree of elongation and radial compression desired, as those skilled in the art will understand.

The sleeves and insert are assembled in a suitable manner. For example, the insert 9 of Fig. 2 may be first placed in the outer sleeve 5. The inner sleeve 3 is then forced into the bore 17 of the insert by the method of U. S. Patent No. 1,739,270 or other suitable means. This assembly results in no relative radial movement of the flange 13 and outer surface 15 hence there is no stress concentration at junction 19. In fact there is substantially no circumferential stress in the outer surface 15. It will be appreciated that minor variations between the diameter of the surface 15 and the inner diameter of sleeve 5 are permissible since they would result in only insignificant stresses at junction 19.

Additional features of the invention reside in the stepped counterbores 21 and 23 that are formed in the insert flange 13 as connected extensions of the inner surface 17. The inner counterbore 21 has a diameter that is substantially greater than the free diameter of surface 17 and preferably the same as the outer diameter of the inner sleeve 3 and the bottom thereof lies in the plane of the junction 19. The counterbore 23 has a diameter that is preferably the same as the inner diameter of the outer sleeve 5 and a depth which is preferably such that the end of the inner sleeve 3 lies slightly above the plane of the bottom of the counterbore 23.

It will be recognized that by virtue of counterbore 21 substantially no radial compression is applied to the unsupported flange 13 by the inner sleeve 3. It is therefore not deformed outwardly at its outer periphery. Since the sleeve extends a slight distance into the counterbore 23, the latter permits the flang portion to expand inwardly toward the sleeve 3 when subject to an axial load. The counterbore 23 also results in the axial load passing directly to the flange 7. Incidentally, if desired, when a pair of bushings is employed, as hereinafter described in connection with Fig. 3, the two bushing flanges may be prestressed by an axial load imposed in the assembly.

An illustrative usage of the flanged joints of this invention is shown in Fig. 3 in connection with the outer end of the upper wishbone assembly of a front end suspension for automobiles. In this structure, the spaced wishbone arms 41 and 43 are detachably mounted on the body 45 by means of through bolts 47. When secured to the body the arms have aligned bores 48. Prior to such securement, the units 1 are placed in the bores 48 and it will be noted that the inner surfaces of the flanges 7 will seat on shoulders 49. The support for the steering support comprises a body portion 51 that has flanges 53 to bear upon the outer faces of the rubber flanges 13 and spindles 55 that fit the inner surface 17 and extend through the sleeve 3 to the outside thereof at which point they receive nuts 57 that shoulder on the ends of the inner sleeves 3 that preferably are not tightened to such an extent as to apply any substantial axial load to the sleeves. After assembly of the arms and support, the bolts 47 are tightened to force the arms 41 and 43 toward each other and thereby compress the rubber insert flanges 13 between the flanges 53 and the shoulders 49 until the sleeves 3 and flanges abut, it being noted that by virtue of counterbore 23 axially compressed rubber flows radially inward against the sleeve to prevent substantial radial elongation of the flange and also grip the sleeve so as to inhibit entrance of grit, etc., between the insert and sleeve 3. The flanges 13 thus provide a resilient axial force transmitting medium between the flanges 53 of body 51 and the shoulders 49 of the wishbone arms 41 and 43 and the cylindrical portions 11 of the inserts take radial loads between the wishbone arms and support 51 while permitting substantial pivotal movement about the axis of bores 48.

It should be noted that a flexible joint 1 having rubber flanges at both ends could be used in Fig. 3 with the same result as the two single flanged units. It is also evident that the unit 1 could be of conical form or of other types of concentric surfaces of revolution and also that the flange 7 need not be provided on the sleeve 5, any suitable transverse abutment for the flange 13, such as shoulder 49, being operative. It should be noted that the term "substantially the same" with respect to the relative diameters of surface 15 and sleeve 5 and the relative diameters of counterbore 21 and sleeve 3 is broad enough to include oversize in the diameter of surface 15 and undersize in counterbore 13 to an extent less than that at which excessive deformation and stress appear in the insert. This limit may, of course, be extended by the provision of generous radii at the sharp corners.

Other modifications will appear to those in the art hence it is not intended to limit the invention to the specific structural details herein shown and described.

What is claimed is:

1. A flexible joint comprising an outer member providing an outer surface of revolution, an inner member within the outer member providing an inner surface of revolution coaxial with but spaced radially inwardly from the outer surface, an annular surface around the outer member at one end of the outer surface extending in a plane transverse to the axis of the surfaces, a rubber insert having a body portion between the inner and outer surfaces and in a state of appreciable radial compression and axial elongation and having a radial flange portion engaging said annular surface, said insert comprising a flanged bushing the body of which has an outer surface of revolution which when unstressed is throughout its length substantially the diameter of the outer member surface whereby it is not materially deformed circumferentially between the members, and an inner surface of revolution which when unstressed is of appreciably less diameter than the inner member surface, whereby the inner surface of the body of the bushing is materially stressed and expanded in a circumferential direction, said insert flange having a counterbore formed therein at the flange end of the bushing with its bottom substantially in the plane of the junction between the flange and the outer surface of revolution of the body of the bushing and a diameter in its undeformed state substantially equal to the diameter of the inner member's surface of revolution.

2. A flexible joint, comprising an outer member providing an outer surface of revolution, an inner member within the outer member providing an inner surface of revolution coaxial with but spaced radially inwardly from the outer surface, an annular surface around the outer member at one end of the outer surface extending radially outwardly from the inside of the outer member, and a rubber insert having a body portion between the inner and outer surfaces and in a state of appreciable radial compression and axial elongation and having a radial flange portion engaging said annular surface, said body portion having an outer surface of revolution which when unstressed throughout its length substantially the diameter of the outer member surface whereby it is not deformed circumferentially between the members, said body portion having an inner surface of revolution which when unstressed is of appreciably less diameter than the inner member surface, whereby the inner surface of the body of the bushing is materially stressed and expanded in a circumferential direction, said flange portion being located outwardly of the end of said inner member.

LEON F. THIRY.

References Cited in the file of this patent

UNITED STATES PATENTS

| Number | Name | Date |
|---|---|---|
| 2,324,984 | Brown | July 20, 1943 |
| 2,351,291 | Ross | June 13, 1944 |
| 2,517,791 | Hutton | Aug. 8, 1950 |
| 2,608,751 | Hutton | Sept. 2, 1952 |

FOREIGN PATENTS

| Number | Country | Date |
|---|---|---|
| 260,681 | Switzerland | Aug. 1, 1949 |
| 679,115 | Germany | July 29, 1939 |
| 944,459 | France | of 1949 |